United States Patent
Matsumura et al.

(10) Patent No.: US 12,010,680 B2
(45) Date of Patent: Jun. 11, 2024

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Shohei Yoshioka, Tokyo (JP); Daisuke Murayama, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 375 days.

(21) Appl. No.: 17/598,614

(22) PCT Filed: Mar. 28, 2019

(86) PCT No.: PCT/JP2019/013882
§ 371 (c)(1),
(2) Date: Sep. 27, 2021

(87) PCT Pub. No.: WO2020/194748
PCT Pub. Date: Oct. 1, 2020

(65) Prior Publication Data
US 2022/0183035 A1 Jun. 9, 2022

(51) Int. Cl.
*H04W 72/1268* (2023.01)
*H04W 72/0446* (2023.01)
*H04W 72/20* (2023.01)
*H04W 72/566* (2023.01)
*H04W 74/08* (2024.01)

(52) U.S. Cl.
CPC ... *H04W 72/1268* (2013.01); *H04W 72/0446* (2013.01); *H04W 72/20* (2023.01); *H04W 72/569* (2023.01); *H04W 74/0875* (2013.01)

(58) Field of Classification Search
CPC ......... H04W 72/1268; H04W 72/0446; H04W 72/20; H04W 72/569; H04W 74/0875; H04W 74/08
See application file for complete search history.

(56) References Cited

U.S. PATENT DOCUMENTS

| | | | |
|---|---|---|---|
| 11,576,148 B2 * | 2/2023 | Lee | H04W 72/56 |
| 2007/0274206 A1 | 11/2007 | Habetha et al. | |
| 2008/0259895 A1 | 10/2008 | Habetha | |

(Continued)

FOREIGN PATENT DOCUMENTS

| | | |
|---|---|---|
| JP | 2007-531374 A | 11/2007 |
| WO | 2005076544 A1 | 8/2005 |
| WO | 2009021205 A2 | 2/2009 |

OTHER PUBLICATIONS

Office Action issued in Chinese Patent Application No. 201980096876.1, mailed on Sep. 5, 2023 (15 pages).

(Continued)

*Primary Examiner* — Redentor Pasia
(74) *Attorney, Agent, or Firm* — Osha Bergman Watanabe & Burton LLP

(57) ABSTRACT

A user terminal includes a transmitting section that performs first signal transmission during a first period within a periodic time interval, and a control section that determines, based on priority of the first signal transmission, whether to perform second signal transmission during a second period after the first period within the time interval. According to an aspect of the present disclosure, resource utilization efficiency can be increased.

4 Claims, 15 Drawing Sheets

(56) References Cited

U.S. PATENT DOCUMENTS

| | | | |
|---|---|---|---|
| 2009/0040984 A1 | 2/2009 | Rajamani | |
| 2018/0332602 A1* | 11/2018 | Lee | H04W 72/569 |
| 2020/0053743 A1* | 2/2020 | Cheng | H04W 4/40 |
| 2020/0205166 A1* | 6/2020 | Huang | H04W 76/27 |
| 2020/0275425 A1* | 8/2020 | Cao | H04L 1/0003 |
| 2021/0160821 A1* | 5/2021 | Lin | H04W 74/08 |
| 2021/0219268 A1* | 7/2021 | Li | H04W 72/20 |
| 2024/0080806 A1* | 3/2024 | Freda | H04W 28/0268 |

OTHER PUBLICATIONS

Office Action issued in the counterpart Japanese Patent Application No. 2021-508669, mailed on Jan. 17, 2023 (4 pages).
InterDigital Inc.; "Sidelink Resource Allocation Mechanism for NR V2X"; 3GPP TSG RAN WG1 #96, R1-1902598; Athens, Greece; Feb. 25-Mar. 1, 2019 (5 pages).
WiMedia Alliance "Distributed Medium Access Control (MAC) for Wireless Networks" MAC Specification: Release 1.5; Dec. 1, 2009 (33 pages).
Extended European Search Report issued in European Application No. 19921897.5, dated Oct. 12, 2022 (8 pages).
International Search Report issued in PCT/JP2019/013882 on May 28, 2019 (1 page).
Written Opinion of the International Searching Authority issued in PCT/JP2019/013882 on May 28, 2019 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

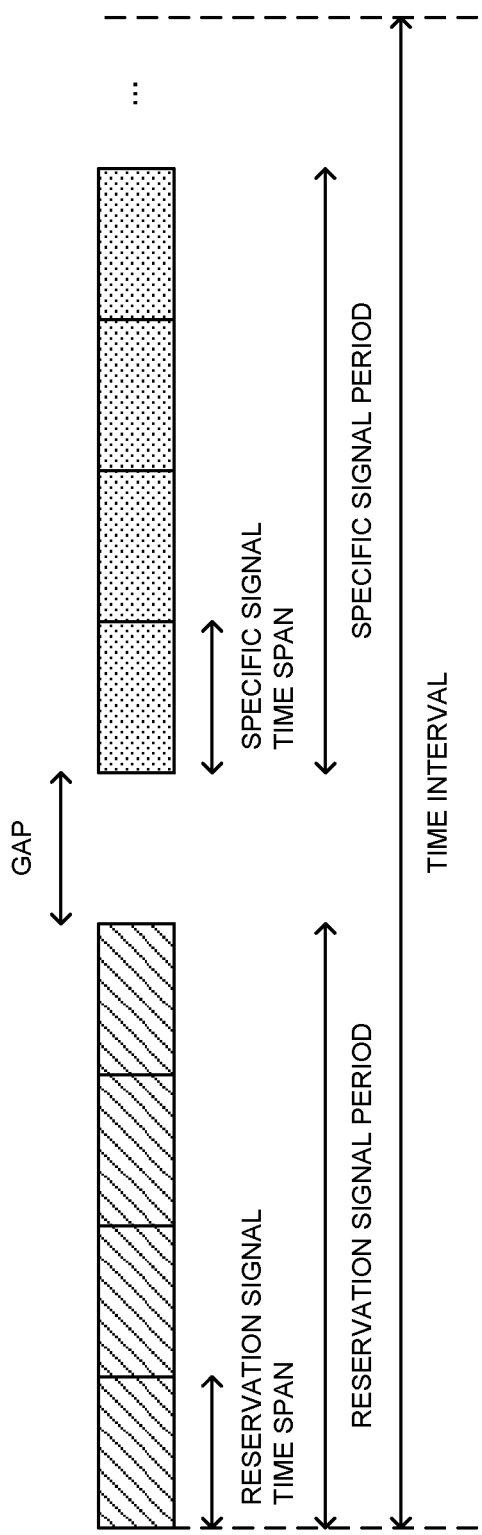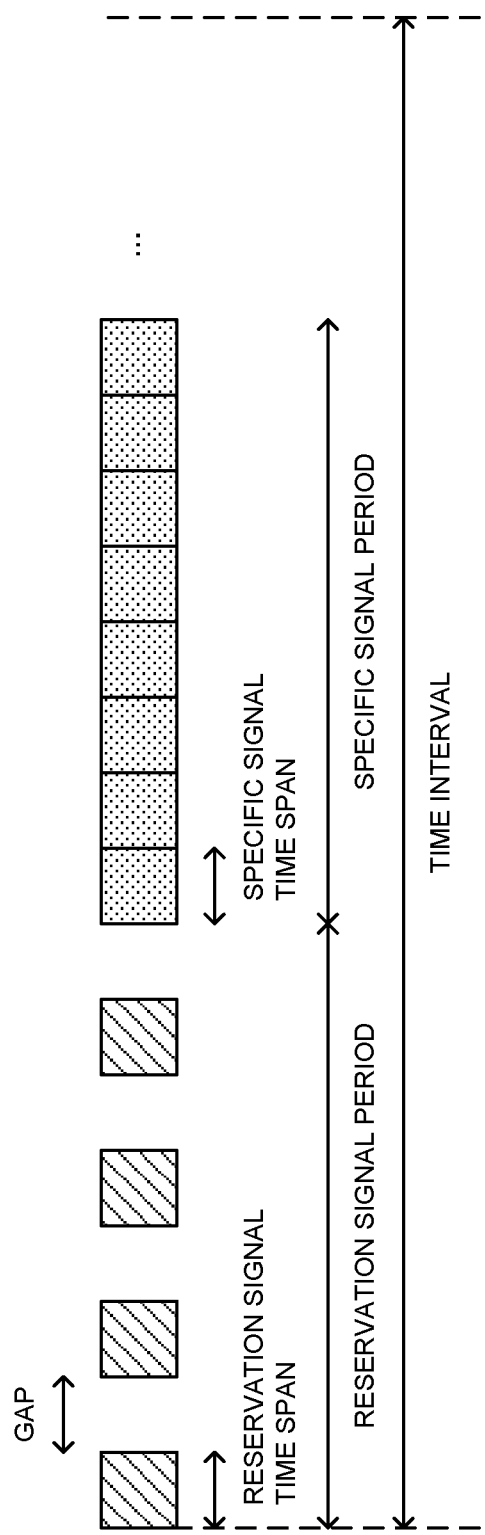

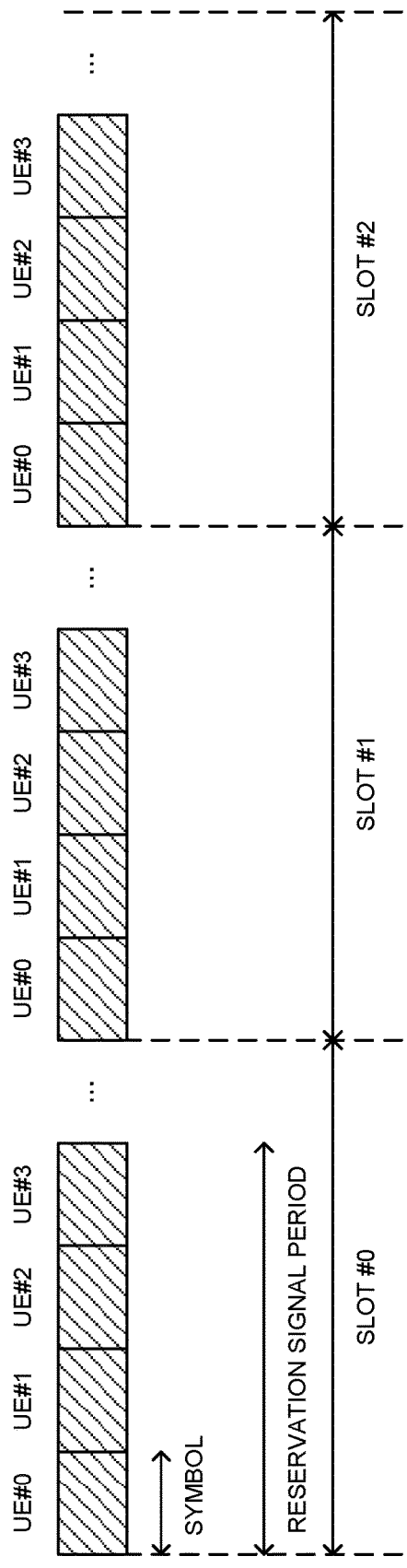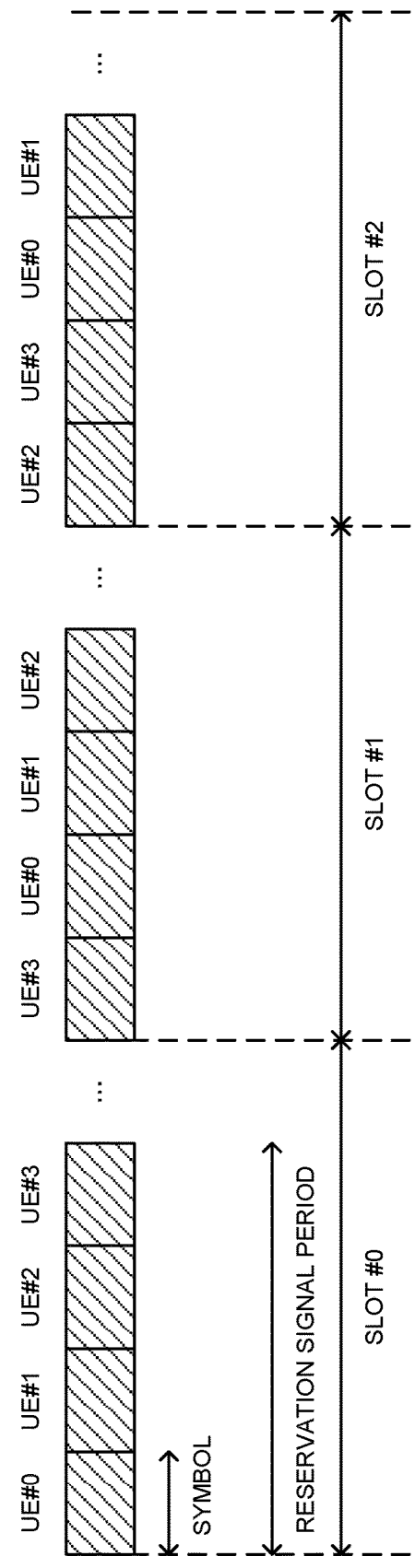

USER TERMINAL AND RADIO COMMUNICATION METHOD

TECHNICAL FIELD

The present disclosure relates to a user terminal and a radio communication method in next-generation mobile communication systems.

BACKGROUND ART

In Universal Mobile Telecommunications System (UMTS) networks, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

In existing LTE systems (for example, LTE Rel. 8 to Rel. 14), a user terminal (User Equipment (UE)) controls reception of a downlink shared channel (for example, Physical Downlink Shared Channel (PDSCH)), based on downlink control information (DCI, also referred to as DL assignment or the like) transmitted via a downlink control channel (for example, Physical Downlink Control Channel (PDCCH)). The user terminal controls transmission of an uplink shared channel (for example, Physical Uplink Shared Channel (PUSCH)), based on DCI (also referred to as UL grant and so on).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems, application of a known autonomous distributed multiple access scheme increases overhead of carrier sense, and this may lead to degradation of system performance such as reduced communication throughput or reduced resource utilization efficiency.

Thus, an object of the present disclosure is to provide a user terminal and a radio communication method that can increase resource utilization efficiency.

Solution to Problem

A user terminal according to an aspect of the present disclosure includes a transmitting section that performs first signal transmission during a first period within a periodic time interval, and a control section that determines, based on priority of the first signal transmission, whether to perform second signal transmission during a second period after the first period within the time interval.

Advantageous Effects of Invention

According to an aspect of the present disclosure, resource utilization efficiency can be increased.

BRIEF DESCRIPTION OF DRAWINGS

FIGS. 2A and 2B are diagrams to show another example of the allocation of the reservation signal period and the specific signal period;

FIGS. 3A and 3B are diagrams to show association of UEs and the reservation signal period;

DESCRIPTION OF EMBODIMENTS

<Autonomous Distributed Multiple Access Scheme>

Figure 1A:
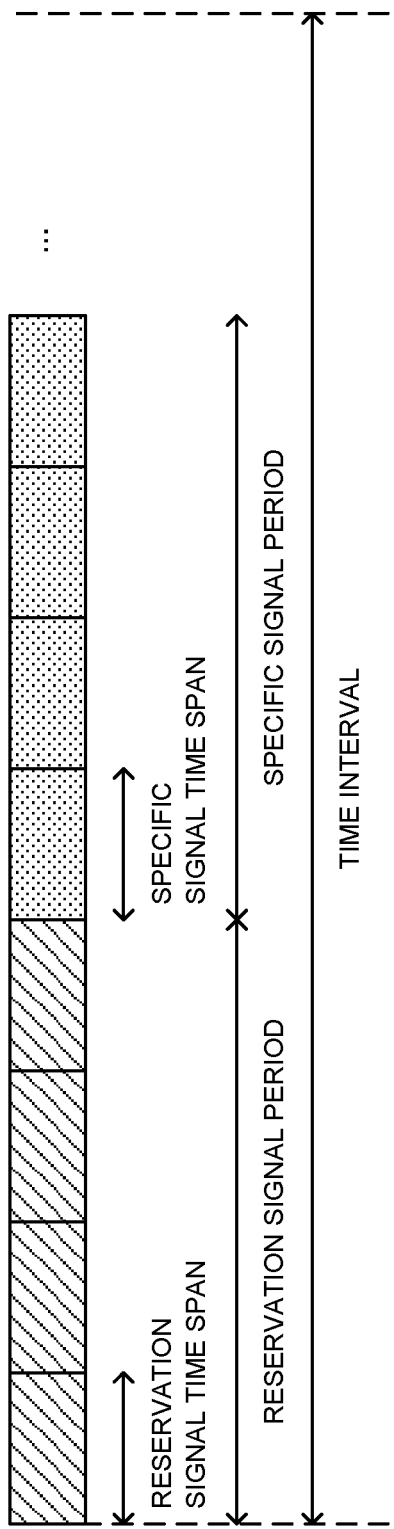
FIGS. 1A and 1B are diagrams to show an example of allocation of a reservation signal period and a specific signal period.

As an autonomous distributed multiple access scheme, for example, wireless local area network (LAN) systems employ Carrier Sense Multiple Access (CSMA)/Collision Avoidance (CA) for the purpose of avoiding collision and/or controlling interference. In CSMA/CA, a given time (Distributed access Inter Frame Space (DIFS)) is provided before transmission, and a transmitting apparatus transmits data after confirming that no other transmission signal is present within the DIFS (carrier sense, listen before talk (LBT)). After data transmission, the transmitting apparatus waits for ACKnowledgement (ACK) from a receiving apparatus. In a case of failing to receive the ACK within the given time, the transmitting apparatus determines that a collision has occurred, and performs retransmission. In a case of detecting another transmission signal before transmission and subsequently detecting no other transmission signal during the DIFS and a backoff period (e.g., random backoff), the transmitting apparatus initiates data transmission.

Note that carrier sense, LBT, listening, Clear Channel Assessment (CCA), channel sensing, or a channel access operation (channel access procedure) may be interpreted as one another.

A node using the autonomous distributed multiple access scheme can transmit data without scheduling of data transmission by a network (NW, for example, a base station).

However, CSMA/CA involves large overhead of carrier sense and the like, leading to a problem such as reduced communication throughput or reduced resource utilization efficiency.

Thus, the inventors of the present invention came up with the idea of a method (for example, an autonomous distributed multiple access scheme) including performing first signal transmission during a first period and determining, based on the priority of the first signal transmission, whether to perform second signal transmission during a second period.

Embodiments according to the present disclosure will be described in detail with reference to the drawings as follows. The radio communication method according to each embodiment may be employed independently or may be employed in combination.

In the present disclosure, a node, a UE, a base station, a radio communication apparatus, a device, and a vehicle may be interpreted as one another.

In the present disclosure, the following may be interpreted as one another: second signal transmission, a second signal, a specific signal, a target signal, data, a UL signal, a PUSCH, a PUCCH, a sounding reference signal (SRS), a demodulation reference signal (DMRS), a sidelink signal (for example, a physical sidelink shared channel (PSSCH), a physical sidelink control channel (PSCCH), and so on.

In the present disclosure, the following may be interpreted as one another: reservation, securing, allocation, bidding, acquisition, control, first signal transmission, preceding transmission, pre-transmission, reference signal transmission, and reservation signal transmission. In the present disclosure, the following may be interpreted as one another: a first signal, a preceding signal, a pre-signal, a reservation signal, an allocation signal, a bidding signal, a control signal, an access signal, a random access signal, a reference signal, a PUSCH, a PUSCH, an SRS, a DMRS, and a sidelink signal (for example, a PSSCH or a PSCCH). In the present disclosure, a signal, information, a preamble, and a channel may be interpreted as one another.

(Radio Communication Method)

First Embodiment

A node in a radio communication system may transmit a reservation signal during a first period (for example, a reservation signal period or a reservation signal time span) and transmit a specific signal during a second period (for example, a specific signal period or a specific signal time span). The reservation signal may be a signal that reserves a resource for a succeeding specific signal or a signal that precedes transmission of the specific signal (that is transmitted in advance).

Before a time resource for transmitting the specific signal, a time resource for transmitting the reservation signal may be allocated (configured, inserted, or mapped). The time resource for transmitting the reservation signal may be a reservation signal time span, a symbol, a mini-slot, a slot, a subframe, and so on. The time resource for transmitting the specific signal may be a specific signal time span, a symbol, a mini-slot, a slot, a subframe, a transmission occasion, and so on.

A reservation signal period including one or more reservation signal time spans may be allocated within a periodic time interval. A specific signal period including one or more specific signal time spans may be allocated within a periodic time interval. The reservation signal period may be allocated before the specific signal period. The time interval may be one of a frame, a subframe, a slot, and a mini-slot.

For example, as shown in FIG. 1A, the reservation signal period and the specific signal period may be allocated within one slot. The reservation signal period may include four reservation signal time spans. Each of the reservation signal time spans may be one symbol. The specific signal period may include four specific signal time spans. The time length of each of the specific signal time spans may be one symbol. A subcarrier spacing (SCS) during the reservation signal period may be equal to an SCS during the specific signal period.

The reservation signal period may be allocated within a given time interval, and the specific signal period may be configured within the same time interval. The reservation signal period may be allocated within a given time interval, and the specific signal period may be configured within a different time interval.

The reservation signal may be transmitted during one symbol and a specific bandwidth. The specific bandwidth may be defined in specifications or configured by higher layer signaling. The specific bandwidth may be one resource block (RB), a bandwidth part (BWP) or another bandwidth.

The node may transmit the reservation signal by using the same subcarrier spacing (SCS) as that for the specific signal. The node may transmit the reservation signal by using an SCS different from the SCS for the specific signal. The reservation signal may have a higher SCS than the SCS of the specific signal.

Information related to at least one of the SCS for the reservation signal period, the SCS for the specific signal period, and the ratio between the SCS for the reservation signal period and the SCS for the specific signal period (for example, the ratio of the SCS for the reservation signal period to the SCS for the specific signal period) may be predefined in specifications or configured by reporting (for example, higher layer signaling) from the network (NW, for example, a base station).

The minimum time required to switch from the SCS for the reservation signal to the SCS for the specific signal may be defined in specifications. The node need not perform signal transmission during SCS switching.

Figure 1B:
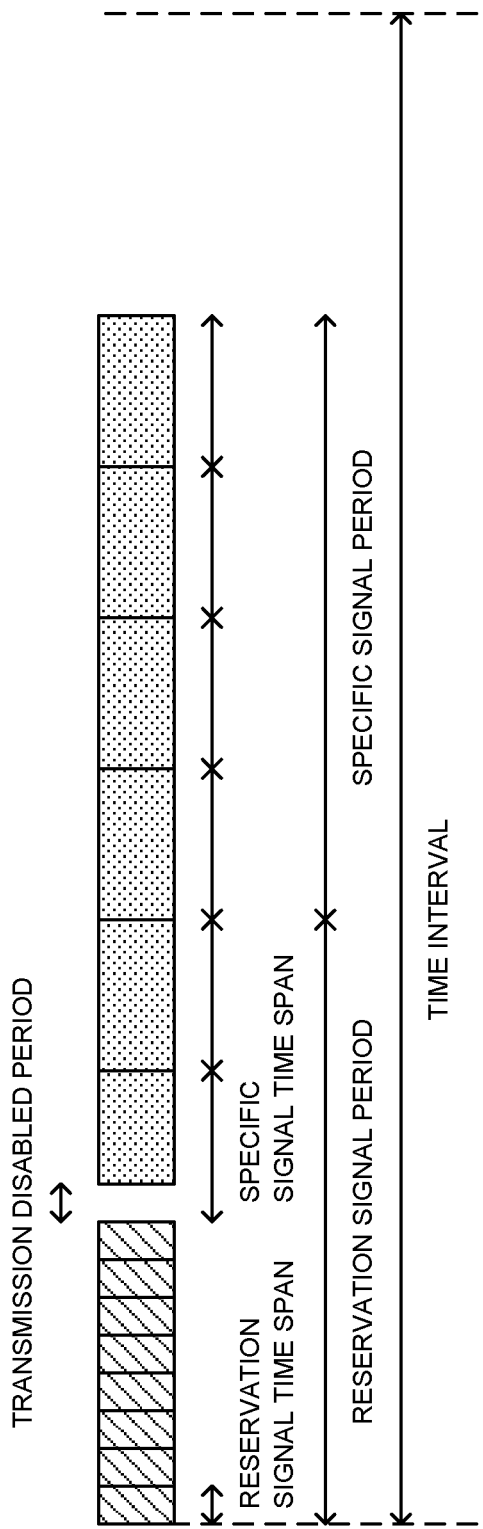

For example, as shown in FIG. 1B, the SCS during the reservation signal period may be higher than the SCS during the specific signal period. In other words, a symbol length during the reservation signal period may be shorter than a symbol length during the specific signal period. A gap (transmission disabled period) may be provided between the reservation signal period and the specific signal period. The time length of the gap may be equal to or greater than the time required to switch the SCS.

Since the reservation signal has a higher SCS than the SCS of the specific signal, the overhead of the reservation signal can be suppressed, reducing the reservation signal time span and the reservation signal period and increasing resource utilization efficiency.

As shown in FIG. 2A, a gap may be provided between the reservation signal period and the specific signal period. The time length of the gap may be equal to or greater than the time required for processing from reception of the reservation signal from another node until transmission of the specific signal.

As shown in FIG. 2B, a gap may be provided between the reservation signal time spans. The time length of the gap may be equal to or greater than the time required for processing from reception of the reservation signal from another node until transmission of the specific signal from the subject node.

According to the first embodiment described above, the specific signal is not scheduled by the NW, and each node transmits the reservation signal to enable the specific signal to be reserved.

Second Embodiment

Different reservation signal time spans may be configured for the respective nodes. The reservation signal time span may be associated with at least one of priority and node. The node may determine the reservation signal time span for the node, and transmit the reservation signal during the reservation signal time span determined. Priority, priority order, and order may be interpreted as one another.

During the reservation signal period, the reservation signals for a plurality of nodes may be subjected to time division multiplexing (TDM).

The reservation signal time span provided to the node may be based on at least one of information provided to the node and the index of the time resource. The node may determine the reservation signal time span for the node, based on at least one of the information provided to the node and the index of the time resource.

The reservation signal time span corresponding to the node may be determined in accordance with at least one of reservation signal time span determination methods 1 and 2 described below.

<<Reservation Signal Time Span Determination Method 1>>

The reservation signal time span for the node may be based on information provided to the node.

The reservation signal time span for the UE may be based on an identifier provided to the UE. The identifier may be at least one of a UE index (ID) and a Radio Network Temporary Identifier (RNTI). The priorities of the reservation signal time spans provided to the UE may correspond to the identifier provided to the node, in ascending order or descending order.

For example, as shown in FIG. 3A, the reservation signal time span is a symbol, and the reservation signal period is allocated for each slot. The priorities of UEs #0 to #3 (UE indices #0 to #3) may correspond to the order of UE indices.

According to reservation signal time span determination method 1, a prioritized identifier is configured for a particular UE to allow transmission of the specific signal from the UE to be prioritized.

<<Reservation Signal Time Span Determination Method 2>>

The reservation signal time span for the node may be based on at least one of information provided to the node and the index of the time resource.

The reservation signal time span may be determined in accordance with a reservation signal time span rule. The reservation signal time span rule may determine the priority of the reservation signal time span for each node by using the time resource index and the identifier provided to the UE. The reservation signal time spans may be allocated in ascending order or descending order of priorities. The reservation signal time span may be determined by a hopping pattern using at least one of a UE ID, an RNTI, a slot index, a symbol index, and a subframe index.

For example, as shown in FIG. 3B, the reservation signal time span is a symbol, and the reservation signal period is allocated for each slot. The priority order (priorities) of UEs #0 to #3 may be based on the UE indices or the slot indices. The priority order corresponding to the order of UE indices may be shifted based on the slot index.

According to reservation signal time span determination method 2, fairness of transmission occasions among the UEs can be improved.

According to the second embodiment described above, collision of reservation signals can be prevented.

Third Embodiment

The node to transmit a specific signal during a specific signal time span may determine a reservation signal time span, and transmit the reservation signal during the reservation signal time span determined.

After transmitting the reservation signal during the reservation signal time span, the UE may transmit the specific signal during the specific signal time span under given conditions. Of the nodes having transmitted the reservation signal during the reservation signal time span, the node having the top priority may transmit the specific signal during the specific signal time span. The reservation signal time span may be associated with the node or the priority of the node.

The reservation signal may be generated in accordance with at least one of reservation signal time span determination methods 1 and 2 described below.

<<Reservation Signal Generation Method 1>>

The reservation signal may be included in a low Peak to Average Power Ratio (PAPR) sequence (a Constant Amplitude Zero Auto Correlation (CAZAC) sequence, a sequence conforming to the CAZAC sequence, for example, a Zadoff-Chu sequence, a computer-generated sequence defined in specifications (table), or the like), or a Pseudo-Random sequence (Pseudo-Noise (PN) sequence, for example, a Gold sequence, an M sequence).

During at least one of a reservation signal time span before the reservation signal time span of the node and a reservation signal time span after the reservation signal time span of the node, the node may receive (measure, sense, listen to, or the like) a signal.

The node may determine whether to transmit the specific signal in accordance with a reception result for the signal during the reservation signal period and the priority rule.

The node may determine the priority for the reservation signal received based on the priority rule, and suspend transmission of the specific signal in response to detection of the reservation signal from a node having a higher priority than that of the subject node. In a case of detecting no reservation signal from a node having a higher priority than that of the subject node, the subject node may transmit the specific signal.

The priority rule may state that the priority is higher for an earlier reservation signal time span for transmission of the reservation signal within the reservation signal period or that the priority is higher for a later reservation signal time span for transmission of the reservation signal within the reservation signal period.

Figure 4:
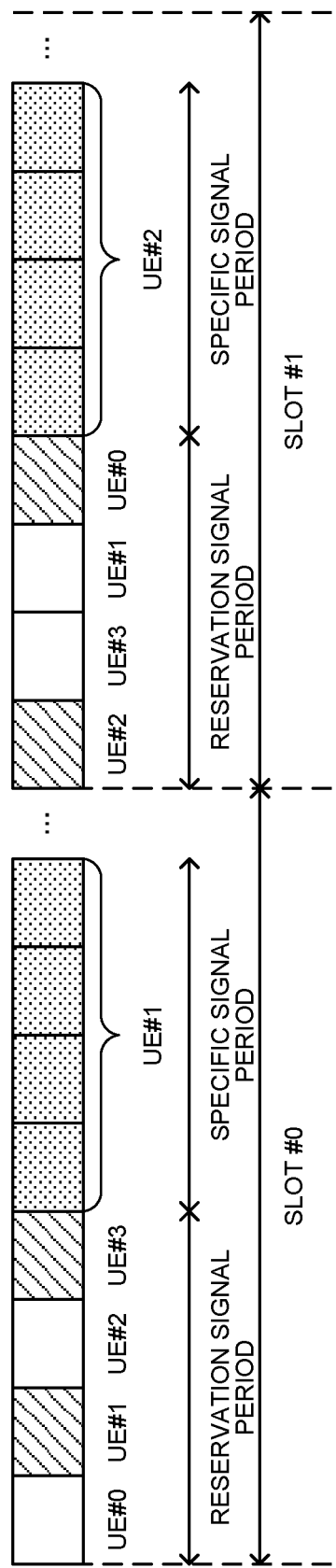
FIG. 4 is a diagram to show an example of reservation of a specific signal based on priority of a reservation signal.

In the example in FIG. 4, the priority rule states that the priority is higher for an earlier reservation signal time span. In slot #0, in a case where UE #1 transmits the reservation signal in symbol #1 within the reservation signal period and UE #3 transmits the reservation signal in symbol #3 within the reservation signal period, UE #1 may transmit the specific signal during the specific signal period. In slot #1, in a case where UE #2 transmits the reservation signal in symbol #0 within the reservation signal period and UE #0 transmits the reservation signal in symbol #3 within the reservation signal period, UE #2 may transmit the specific signal during the specific signal period.

<<Reservation Signal Generation Method 2>>

The reservation signal may indicate at least one of information regarding a resource for the specific signal (at least one of a time resource, a frequency resource, and a code resource) and information regarding a destination for the specific signal. The reservation signal may be control information (for example, sidelink control information (SCI)) transmitted from the UE to another UE.

In the reservation signal period, the node may receive a signal during at least one of a reservation signal time span before the reservation signal time span of the node and a reservation signal time span after the reservation signal time span of the node.

Each node may be configured with a plurality of bandwidths. The node may use different bandwidths in order of the priorities of the reservation signals transmitted.

The node may determine the priority for the reservation signal received based on the priority rule, and in a case where the node receives the reservation signal from a node having a higher priority than the priority of the subject node, and the resource indicated in the reservation signal includes at least a part of the resource for the specific signal to be transmitted by the subject node, the subject node may suspend transmission of the specific signal or may select the bandwidth in order of priorities of the reservation signals transmitted and transmit the specific signal in the selected bandwidth.

The node may determine the priority for the reservation signal received based on the priority rule, and in a case where the node receives the reservation signal from a node having a higher priority than the priority of the subject node, and the destination indicated in the reservation signal is the subject node, the subject node may suspend transmission of the specific signal or may select the bandwidth in order of priorities of the reservation signals transmitted and transmit the specific signal in the selected bandwidth.

The priority rule may state that the priority is higher for an earlier reservation signal time span for transmission of the reservation signal within the reservation signal period or that the priority is higher for a later reservation signal time span for transmission of the reservation signal within the reservation signal period.

Figure 5:
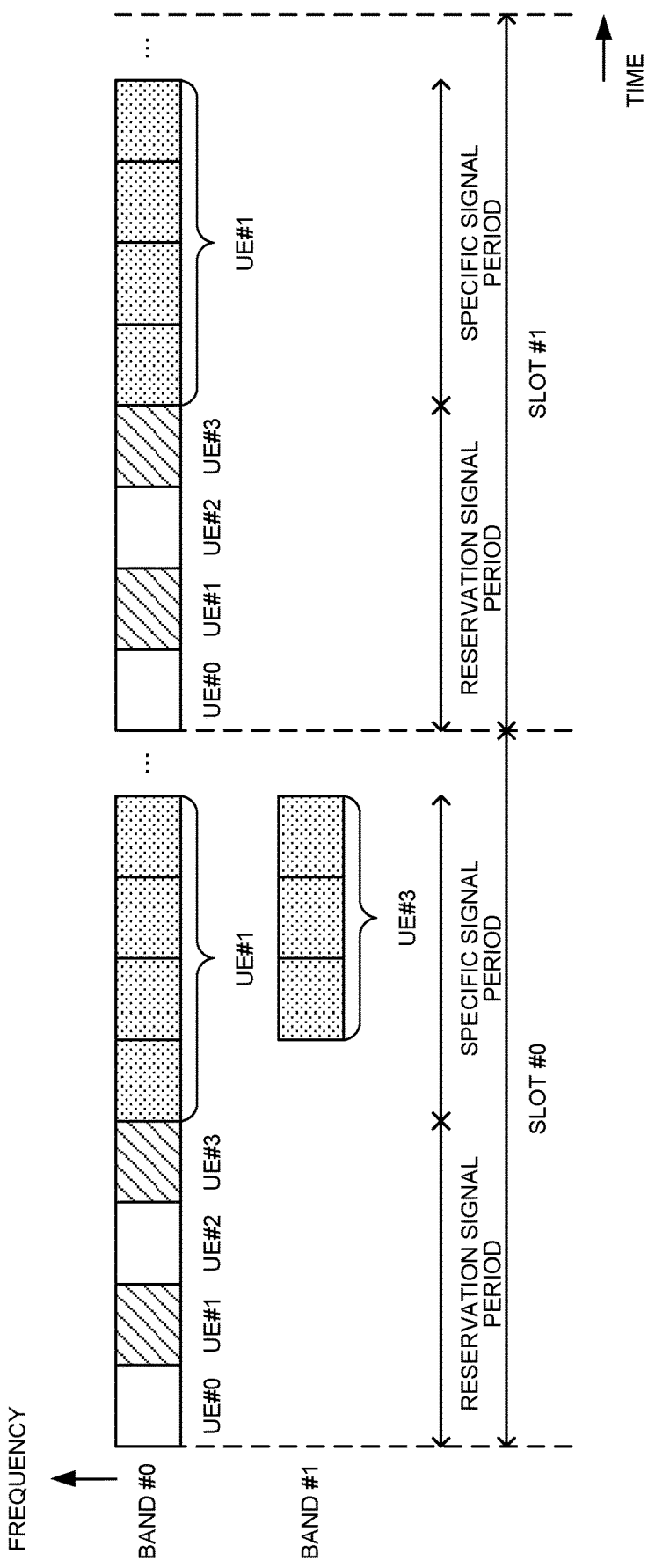
FIG. 5 is a diagram to show an example of the specific signal period using a plurality of bandwidths.

In the example in FIG. 5, the priority rule states that the priority is higher for an earlier reservation signal time span. In the illustrated case, each UE is configured with bandwidths #0 and #1 for slot #0 and configured with bandwidth #0 for slot #1.

In slot #0, in a case where UE #1 transmits the reservation signal in symbol #1 within the reservation signal period and UE #3 transmits the reservation signal in symbol #3 within the reservation signal period, UE #1 may transmit the specific signal during the specific signal period in bandwidth #0. UE #3 may transmit the specific signal during the specific signal period in bandwidth #1. In slot #1, in a case where UE #1 may transmit the reservation signal in symbol #1 within the reservation signal period and UE #3 may transmit the reservation signal in symbol #3 within the reservation signal period, UE #1 may transmit the specific signal during the specific signal period in bandwidth #0. UE #3 need not transmit the specific signal.

According to the third embodiment, even in a case where a plurality of nodes transmit the reservation signal during the reservation signal period, the prioritized node can appropriately transmit the specific signal during the specific signal period.

Fourth Embodiment

A node intending to transmit the specific signal during the specific signal time span may transmit the reservation signal during a common reservation signal time span. After transmitting the reservation signal during the reservation signal time span, the UE may transmit the specific signal during the specific signal time span under given conditions.

A plurality of nodes may transmit the reservation signal during one reservation signal time span. In a case where the reservation signal time span is a symbol, a plurality of nodes may transmit the reservation signal in one symbol.

The reservation signals from a plurality of nodes may be subjected to code division multiplex (CDM) during the same reservation signal time span and in the same bandwidth.

A plurality of nodes may transmit the reservation signals based on different sequences during one reservation signal time span.

Compared to a case where the reservation signal time span is associated with the node, it is possible to reduce the reservation signal period and overhead.

The sequence for the reservation signal may be associated with the sequence index. The sequence index may be based on at least one of a base sequence index used for the sequence for the reservation signal and a cyclic shift index.

The node may determine whether to transmit the specific signal in accordance with a reception result for the signal during the reservation signal period and the priority rule (for example, as is the case with at least one of reservation signal generation methods 1 and 2).

The sequence may be associated with at least one of the priority and the node. The priority rule may state that the priority increases with a decrease in sequence index or that the priority increases with an increase in sequence index.

A node transmitting the reservation signal during a given reservation signal time span may recognize the reservation signal from another node during the reservation signal time span.

The node may recognize the reservation signal from another node in accordance with at least one of another node signal recognition methods 1 and 2 described below.

<<Another Node Signal Recognition Method 1>>

A node may support full duplex communication (simultaneous transmission and reception in the same time resource and frequency resource). At the same frequency (for example, at least one resource block (RB)), the node may transmit the reservation signal, while simultaneously receiving the reservation signal from another node. At different frequencies (for example, at least one resource block (RB)), the node may transmit the reservation signal, while simultaneously receiving the reservation signal from another node.

For example, the node may transmit the reservation signal during the reservation signal time span, receive a signal during the reservation signal time span, subtracts the reservation signal of the node from the received signal, and based on a subtraction result, detect that another node has transmitted the reservation signal. The node may determine that another node has transmitted the reservation signal in a case where the subtraction result exceeds a threshold.

Figure 6:
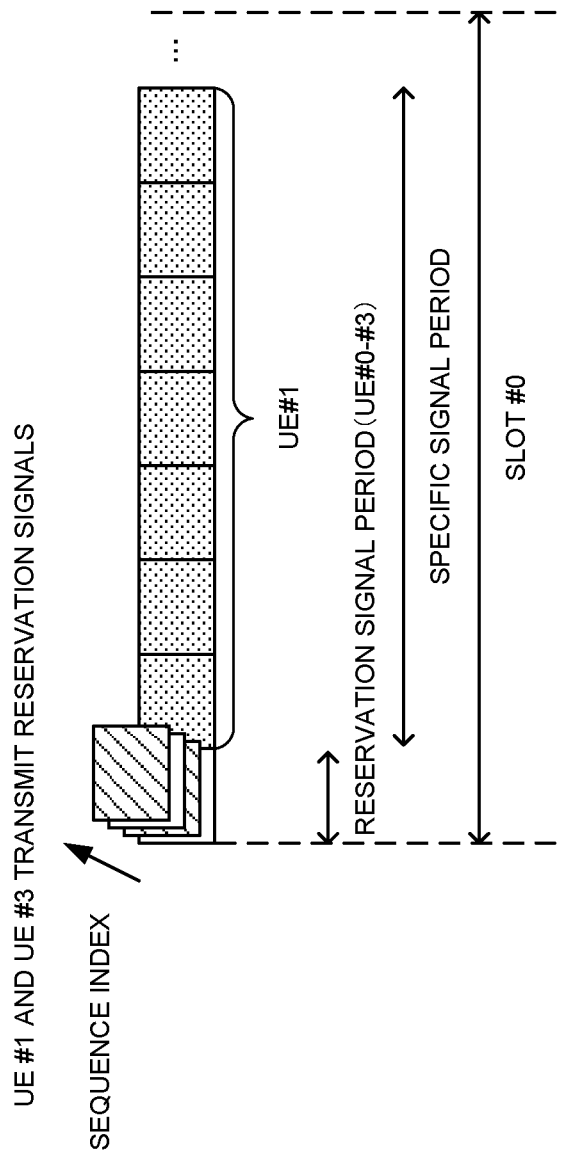
FIG. 6 is a diagram to show an example of a CDMed reservation signal.

For example, as shown in FIG. 6, the reservation signal period may include one reservation signal time span. The priority rule states that the priority increases with a decrease in sequence index. During the reservation signal time span, UE #1 transmits the reservation signal using a sequence with sequence index #1, and UE #3 transmits the reservation signal using a sequence with sequence index #3. UE #1 may detect the reservation signal of UE #3 by subtracting the reservation signal of UE #1 from the received signal during the reservation signal time span. UE #3 detects the reservation signal of UE #1 by subtracting the reservation signal of UE #3 from the received signal during the reservation signal time span. UE #1 has a higher priority than the priority of UE #3, and thus during the specific signal period, UE #1 transmits the specific signal, whereas UE #3 does not transmit the specific signal.

<<Another Node Signal Recognition Method 2>>

In response to reception of at least one reservation signal, the NW may transmit, among the reservation signals received, a response signal indicating the node with the top priority or the top priority. The NW may transmit the response signal during a response signal period. In this case, the node need not support the simultaneous transmission and reception in the same time resource and frequency resource (need not have the capability of simultaneous transmission and reception in the same time resource and frequency resource.

The response signal period may be between the reservation signal period and the specific signal period. A gap may be provided between the response signal period and the specific signal period. The time length of the gap may be equal to or greater than the time required from reception of the response signal until transmission of the specific signal. The response signal period may succeed each reservation signal period reservation signal time span.

The node may receive the response signal and determine, based on the response signal, whether the node is to transmit the specific signal. By comparing the priority indicated in the response signal received with the priority of the node, the node may determine whether the node is to transmit the specific signal. In a case where the priority indicated in the response signal received is the priority of the node, the node may determine that the node is to transmit the specific signal. In a case where the priority indicated in the response signal received is higher than the priority of the node, the node may determine that the node is not to transmit the specific signal.

Figure 7:
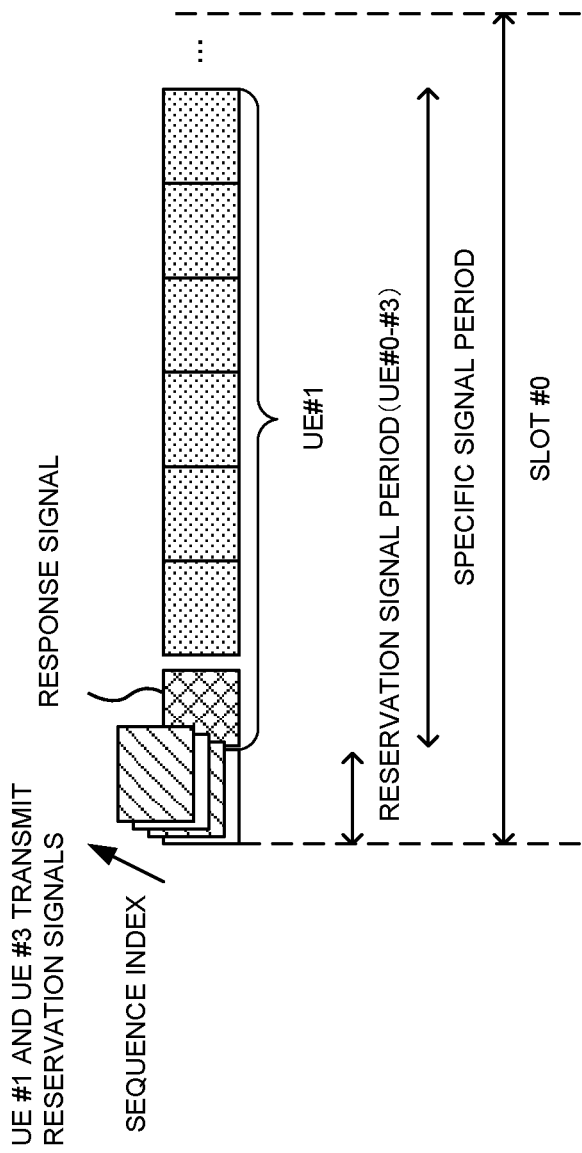
FIG. 7 is a diagram to show an example of the CDMed reservation signal and a response signal.

For example, as shown in FIG. 7, the reservation signal period may include one reservation signal time span. The priority rule states that the priority increases with a decrease in sequence index. During the reservation signal time span, UE #1 transmits the reservation signal using a sequence with sequence index #1, and UE #3 transmits the reservation signal using a sequence with sequence index #3. In response to reception of the reservation signals from UEs #1 and #3, the NW may transmit, during the response signal period, the response signal indicating that UE #1 has the top priority. In response to reception of the response signal, UE #1 transmits the specific signal during the specific signal period. In response to reception of the response signal, UE #3 does not transmit the specific signal.

According to the fourth embodiment described above, the reservation signal period can be shortened, enabling a reduction in the overhead of the reservation signal.

Fifth Embodiment

The reservation signal may indicate at least one of information regarding a resource for the specific signal (at least one of a time resource, a frequency resource, and a code resource) and information regarding a destination for the specific signal. The reservation signal may be SCI transmitted from the UE to another UE. The information regarding the resource for the specific signal may be referred to as information (bidding information) for bidding of the resource for the specific signal.

The reservation signal may include a DMRS and data. The data may include the bidding information. The DMRS may be multiplexed with the data (for example, time division multiplex (TDM) or frequency division multiplex (FDM)).

The reservation signal may be a resource associated with the bidding information. The resource may be at least one of the time resource (for example, symbols and so on), the frequency resource (for example, RBs and so on), a spatial resource (for example, spatial layers, antenna ports, and so on), and the code resource (for example, sequence indices, reference sequences, cyclic shifts, and so on). A plurality of candidates for the resource may be associated with a plurality of respective candidates for the bidding information. The node may select a resource associated with the bidding information, and use the resource selected to transmit the reservation signal.

Figure 8:
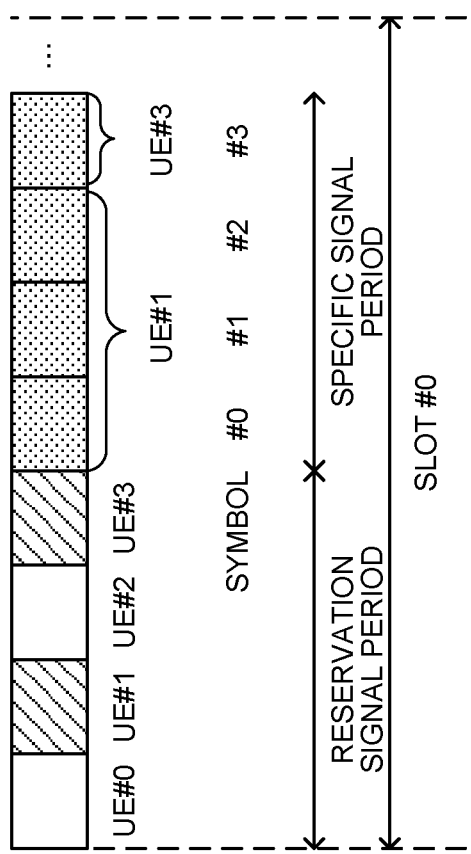
FIG. 8 is a diagram to show an example of reservation of the specific signal using bidding information.

In FIG. 8, for the specific signal for UE #1, symbols #0 to #2 within the specific signal period may be used, and for the specific signal for UE #3, symbol #3 within the specific signal period may be used. UEs #1 and #3 may transmit, during a given reservation signal time span within the reservation signal period, the reservation signal indicating the bidding information.

The bidding information may include a start timing and a time length for the specific signal. For example, the start timing for the specific signal may be indicated by the index of a unit time resource. The time length of the specific signal may be indicated by the number of unit time resources. The unit time resource may be at least one of the slot and the symbol. The start timing may be represented by a difference from the start or end of the reservation signal time span (transmission of the reservation signal) or represented by a difference from the start or end of the reservation signal period.

In FIG. 8, the bidding information for UE #1 may indicate start symbol #0 and a time length of three symbols, and the bidding information for UE #3 may indicate start symbol #3 and a time length of one symbol.

The bidding information may be a bit map indicating a resource (specific signal time span) for the specific signal. The specific signal time span may be a slot or a symbol. Each of the bits in the bit map may correspond to the specific signal time span.

In FIG. 8, the bidding information for UE #1 may be 1110, and the bidding information for UE #3 may be 0001. Each bit may indicate whether to transmit the specific signal during each specific signal time span (symbol) in the specific signal period (1) or not (0).

According to the fifth embodiment, since whether the specific signal time span can be utilized can be determined by receiving the reservation signal from another node, the resource utilization efficiency during the specific signal period can be increased.

Sixth Embodiment

A node that can acquire no specific signal resource by the reservation signal (having failed in bidding) may transmit the specific signal by using an available resource within the specific signal period. The available resource may be a resource included in the specific signal period and indicated in none of the reservation signals.

Each node may monitor the reservation signal during the reservation signal time spans other than the reservation signal time span for the node.

Figure 9:
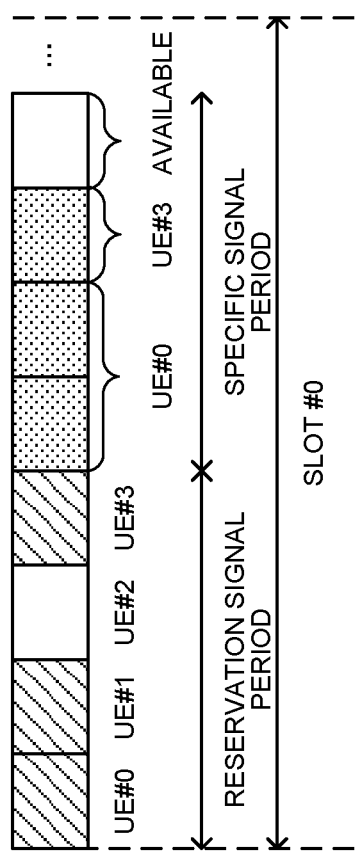
FIG. 9 is a diagram to show an example of an available resource during the specific signal period.

For example, in the example in FIG. 9, the priorities are in the order of UEs #0, #1, #2, and #3. Each of UEs #0 to #3 transmits the reservation signal during the reservation signal time span corresponding to the priority of the UE. The bidding information for UE #0 indicates a specific signal resource with start symbol #0 and a time length of two symbols, the bidding information for UE #1 indicates a specific signal resource with start symbol #0 and a time length of one symbol, and the bidding information for UE #0 indicates a specific signal resource with a start symbol #2 and a time length of one symbol.

The specific signal resource for UE #3 overlapping none of the specific signal resources for the other UEs, and thus a specific signal resource is acquired, and the specific signal is transmitted in the specific signal resource. The specific signal resource for UE #0 overlaps the specific signal resource for UE #1. UE #0 having a higher priority than the priority of UE #1 acquires a specific signal resource, and transmits the specific signal in the specific signal resource. On the other hand, UE #1 can acquire no specific signal resource.

In a case where the reservation signal time spans are provided in the order of priority and the reservation signal from a second node is received during a reservation signal time span before the reservation signal time span for a first node, the first node need not transmit the reservation signal indicating a resource overlapping the resource indicated in the reservation signal for the second node. In response to failure in decoding of the reservation signal from the second node before transmission of the reservation signal due to a time required for data demodulation, the first node may transmit the reservation signal indicating a resource overlapping the resource indicated in the reservation signal for the second node.

After transmitting the reservation signal indicating a specific signal resource overlapping none of the resources indicated in the reservation signals from the other nodes, the node may acquire the specific signal resource, and transmit the specific signal in the specific signal resource. After transmitting the reservation signal indicating a specific signal resource overlapping any of the resources indicated in the reservation signals from the other nodes, the node may determine failure in acquiring the specific signal resource.

In a case where none of the available resources within the specific signal period are utilized, the node may receive a reservation signal having a higher priority than the priority of the reservation signal for the node.

In a case where any available resource within the specific signal period is utilized, the node may receive, during the reservation signal period, all the reservation signals other than the reservation signal for the node.

In a case where a plurality of nodes having transmitted the reservation signal can acquire no specific signal resources, a node utilizing an available resource may be determined in accordance with at least one of available resource utilization methods 1 to 3 described below.

<<Available Resource Utilization Method 1>>

In a case where a plurality of nodes having transmitted the reservation signal can acquire no specific signal resource, one of the plurality of nodes that has the top priority may acquire an available resource and transmit the specific signal by using the available resource (may acquire an available resource). The specific signal can be transmitted in an available resource (the available resource has a size equal to or greater than the size of the specific signal resource), and a node having the top priority may acquire the available resource.

Figure 10:
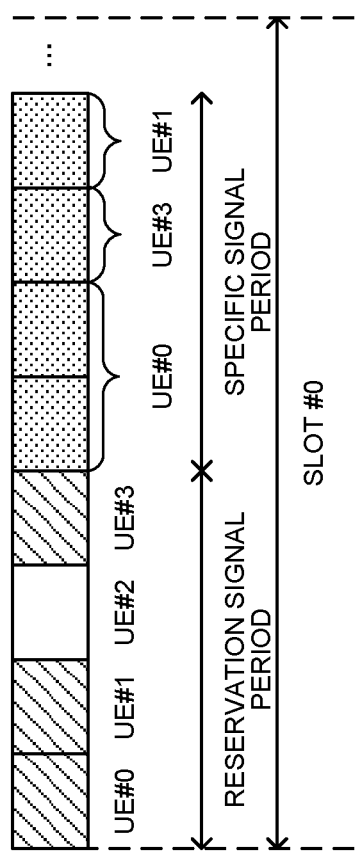
FIG. 10 is a diagram to show an example of utilization of an available resource during the specific signal period.

FIG. 10 is a diagram to show an example of a case in which the specific signal is transmitted in the available resource in FIG. 9. Since UE #1 has a lower priority than the priority of UE #0, UE #1 fails to acquire the specific signal resource indicated in the reservation signal. However, UE #1 can transmit the specific signal in an available resource (symbol #3) indicated in none of the reservation signals (the available resource has a size equal to or greater than the size of the specific signal resource for UE #1), and thus UE #1 transmits the specific signal.

<<Available Resource Utilization Method 2>>

In a case where a plurality of nodes having transmitted the reservation signals can acquire no specific signal resource, available resources may be distributed among m nodes of the plurality of nodes that have the highest priorities. The priorities may be associated with the transmission order of the reservation signals. The available resource may be equally divided into m available time intervals (specific signal resources) in the time direction. The m available time intervals may be allocated to m nodes in order of decreasing priority (descending priority). The nodes to which the available time intervals are allocated may transmit the specific signal during the available time interval.

m may be defined in specifications or configured by higher layer signaling.

<<Available Resource Utilization Method 3>>

In a case where a plurality of nodes having transmitted the reservation signals can acquire no specific signal resource, each of the plurality of nodes may determine based on random numbers whether to transmit the specific signal.

In a case where n nodes can acquire no specific signal resource (n is the number of bidding failed nodes), each of the nodes may transmit the specific signal in the available resource at a probability of 1/n. In a case where the number of bidding failed nodes is n, then each of the nodes may transmit the specific signal in the available resource at a probability of 1/n×α (α>=1). α may be defined in specifications or configured by higher layer signaling.

According to the sixth embodiment, nodes having failed in bidding can transmit the specific signals, enabling an increase in resource utilization efficiency.

Seventh Embodiment

Resources for the reservation signals (for example, reservation signal time spans) need not be dedicatedly provided to the nodes (need not be dedicatedly configured for the UEs and need not be based on the UE indices). A common resource may be used for the reservation signals from a plurality of nodes, or the reservation signals from the plurality of nodes may collide with one another.

The reservation signal period may be one reservation signal time span (for example, one symbol) common to a plurality of nodes.

Each of the nodes may recognize the reservation signal from another node (collision of reservation signals) in accordance with at least one of another node signal recognition methods 1 and 2 described above. In a case where a node having transmitted the reservation signal recognizes a collision of the reservation signal, the node may perform at least one of collision processings 1 and 2 below.

<<Collision Processing 1>>

In a case where a node having transmitted the reservation signal recognizes a collision of the reservation signal, the node need not transmit the specific signal.

<<Collision Processing 2>>

In a case where a node having transmitted the reservation signal recognizes a collision of the reservation signal, the node may determine, based on random numbers, whether to transmit the specific signal.

A node having transmitted the reservation signal and detected a collision of the reservation signal may transmit the specific signal in the specific signal resource at a probability of $1/M \times \alpha$ ($\alpha >= 1$). In a case where the number of bidding failed nodes is n, then each of the nodes may transmit, based on random numbers, the specific signal in the specific signal resource at a probability of $1/M \times \alpha$ ($\alpha >= 1$). M may be the number of nodes that use one reservation signal time span (or the maximum number of nodes that use one reservation signal time span). M may be defined in specifications or configured by higher layer signaling. $\alpha$ may be defined in specifications or configured by higher layer signaling.

The node may determine, based on machine learning (or artificial intelligence (AI)), whether to transmit the specific signal in the specific signal resource. The node may store at least one of information related to transmission of the reservation signal from the node, a recognition result for the reservation signal from another node, and a recognition result for a collision of the reservation signal. The node may determine, based on storage contents (or history), whether to transmit the specific signal in the specific signal resource. The node may determine (optimize) specific signal transmission rules (for example, a determination criterion for specific signal transmission, the probability of transmission of the specific signal, and so on) based on the storage contents (or log), and determine, based on the specific signal transmission rules, whether to transmit the specific signal in the specific signal resource. For example, the node may determine the probability, based on the storage contents, and transmit the specific signal at the determined probability, based on random numbers.

Figure 11:
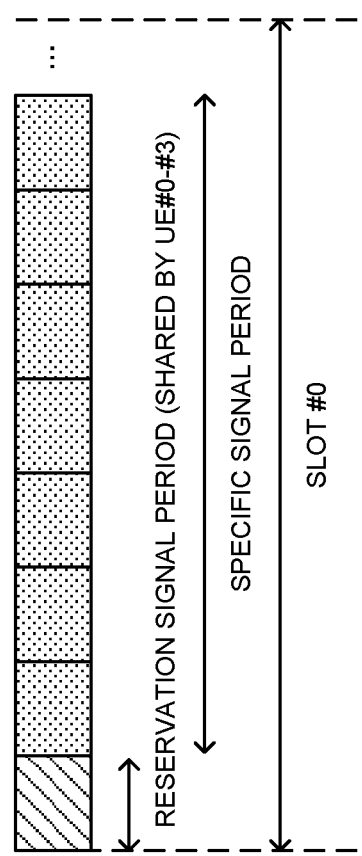
FIG. 11 is a diagram to show an example of a case in which a plurality of UEs share a reservation signal time span.

For example, as shown in FIG. 11, UEs #0 to #3 are configured with the same reservation signal time span. Each UE determines the probability of transmission of the specific signal, and transmits the specific signal during the specific signal period in a case where the random numbers comply with the probability.

According to the seventh embodiment described above, the reservation signal period can be shortened, enabling an increase in resource utilization efficiency.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 12:
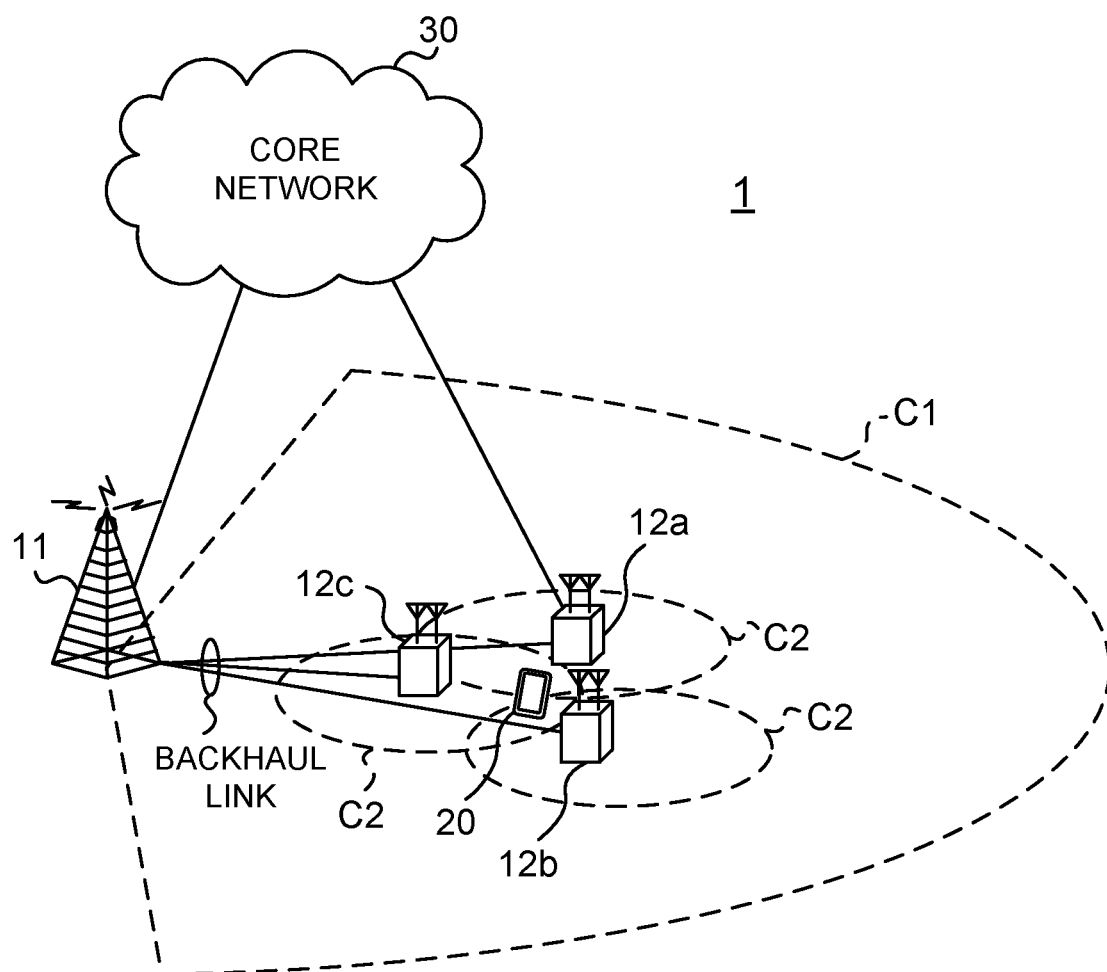
FIG. 12 is a diagram to show an example of a schematic structure of a radio communication system according to one embodiment.

FIG. 12 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 13:
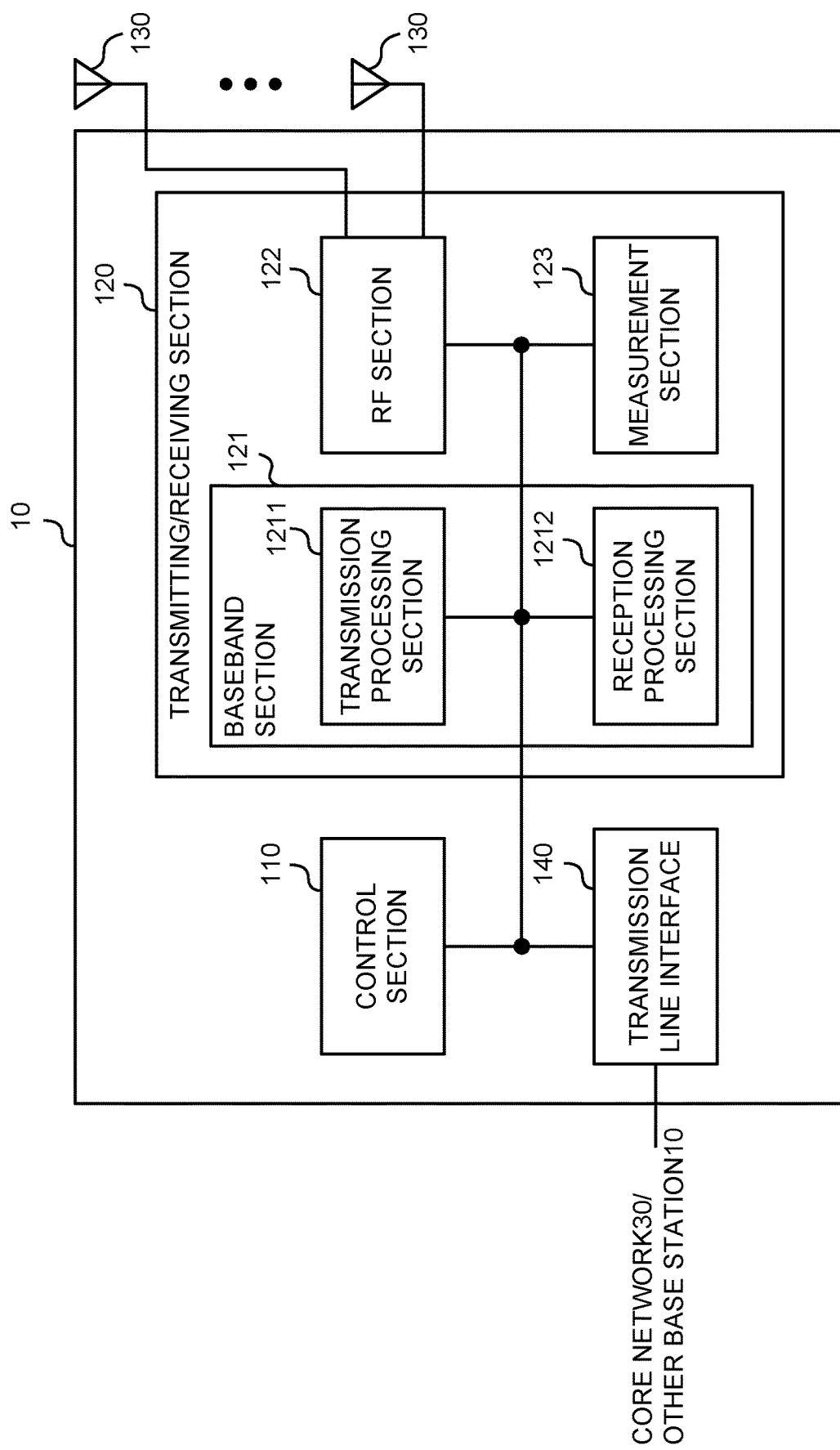
FIG. 13 is a diagram to show an example of a structure of a base station according to one embodiment.

FIG. 13 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the user terminal 10 in the present disclosure may be constituted with at least one of the transmitting/receiving section 120 and the transmitting/receiving antennas 130.

The transmitting/receiving section 120 may perform first signal transmission during a first period within the periodic time interval. The control section 110 may determine, based on the priority of the first signal transmission, whether to perform second signal transmission during a second period after the first period within the time interval (first embodiment).

(User Terminal)

Figure 14:
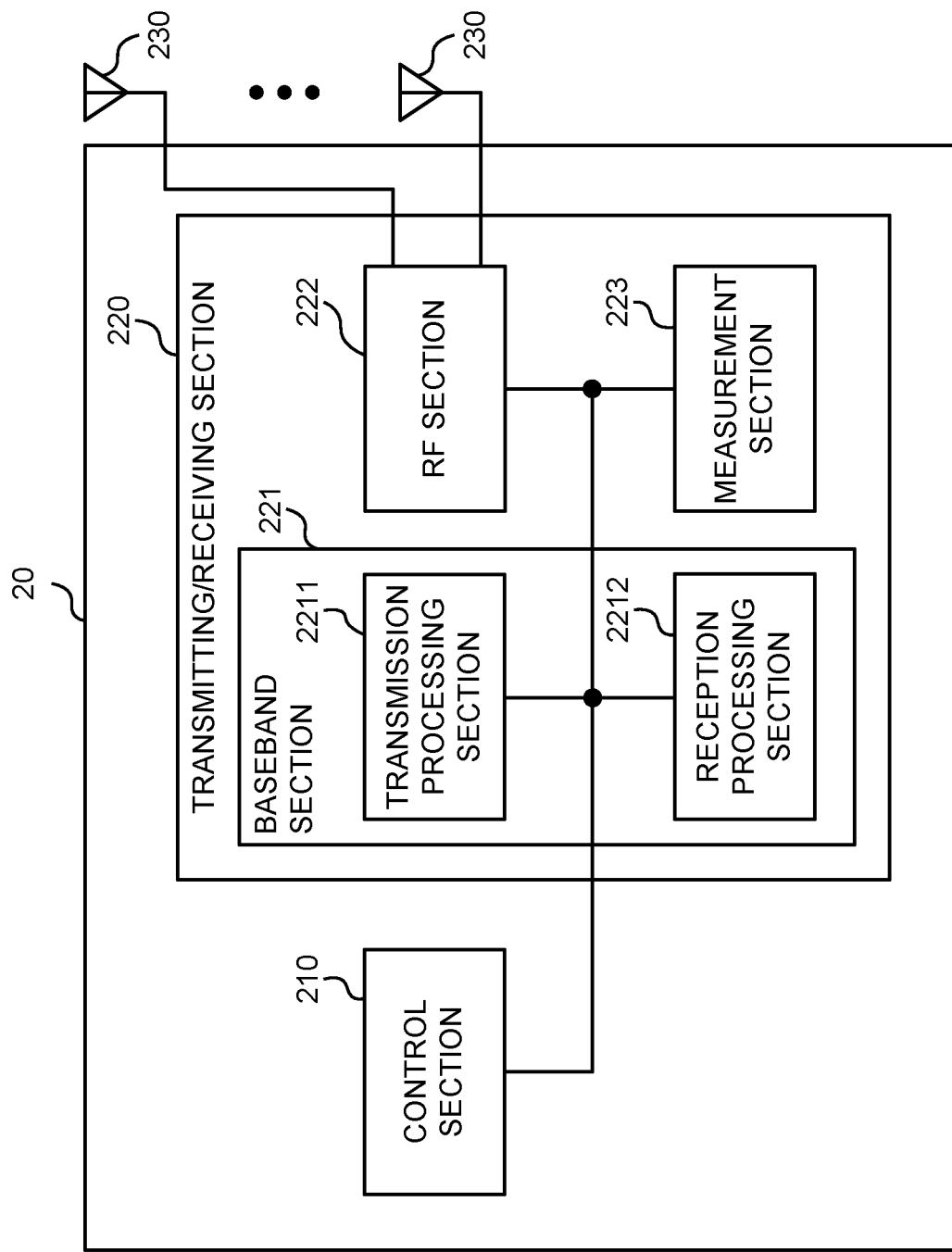
FIG. 14 is a diagram to show an example of a structure of a user terminal according to one embodiment.

FIG. 14 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the transmission line interface 240.

The transmitting/receiving section 220 may perform first signal transmission during a first period within the periodic time interval. The control section 210 may determine, based on the priority of the first signal transmission, whether to perform second signal transmission during a second period after the first period within the time interval (first embodiment).

The priority may be associated with at least one of the transmission order during the second period and the sequence used for the first signal transmission (second, third, and fourth embodiments).

The first signal transmission may indicate a resource for the second signal transmission (third and fifth embodiments).

In a case where the priority is lower than the priority of the first signal transmission from another user terminal, the control section 210 may determine whether to perform the second signal transmission in a resource not indicated in the first signal transmission from the other user terminal (embodiment 6).

In a case where the first signal transmission collides with the first signal transmission from the other user terminal, the control section 210 may determine whether to perform the second signal transmission, based on at least one of a configured value and a history of the first signal transmission(s) from one or more user terminals (embodiment 7).

The first signal transmission may have a higher SCS than the SCS of the second signal transmission (first embodiment).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 15:
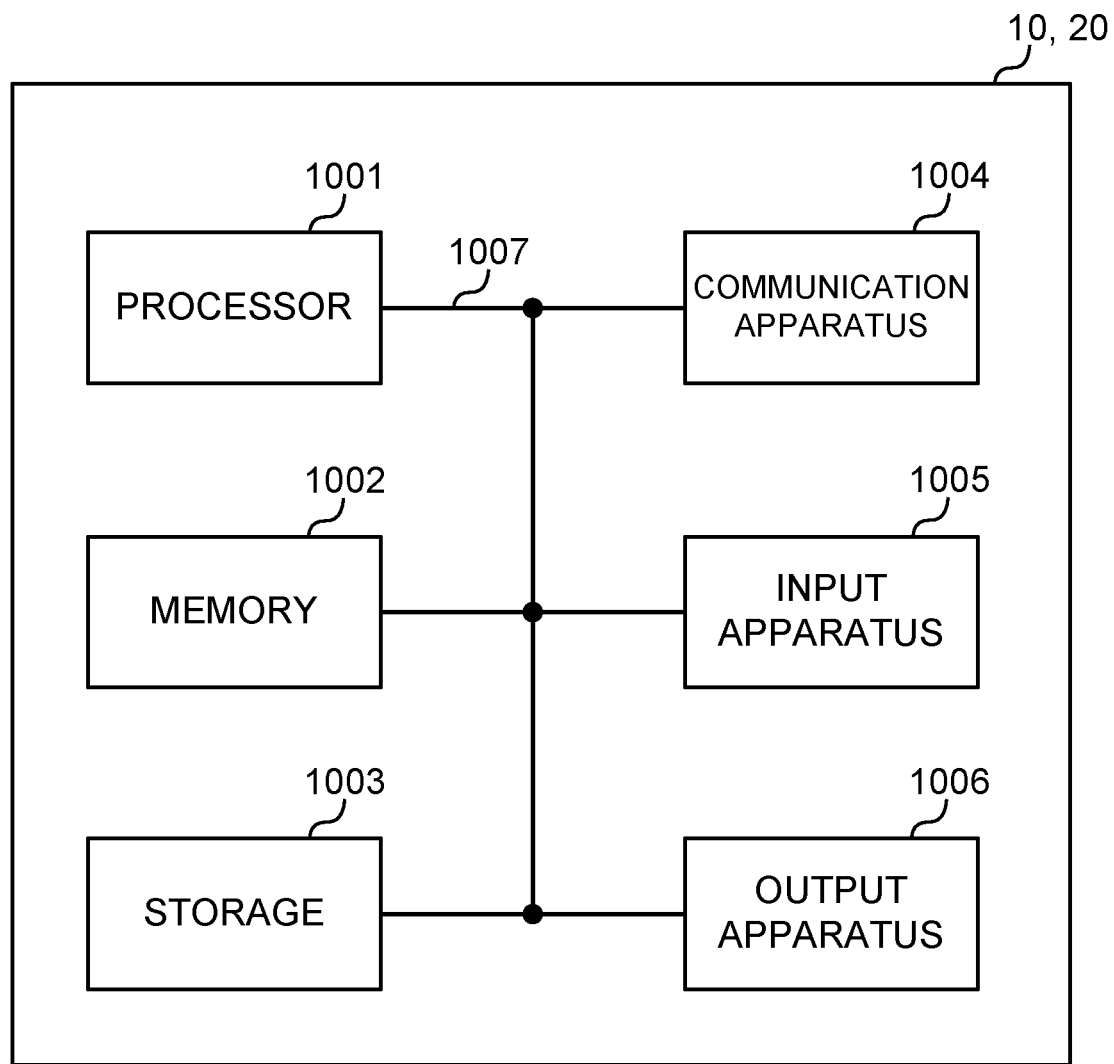
FIG. 15 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 15 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot" a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a processor that determines a first resource for a first transmission, according to a first priority based on first sidelink control information, according to a measurement result of received power of received second sidelink control information, and according to a second priority based on the received second sidelink control information; and
a transmitter that transmits the first sidelink control information indicating the first resource for the first transmission,
wherein the processor, when received third sidelink control information indicates a second resource for a second transmission and the second resource is at least a part of the first resource, determines whether or not to perform the first transmission using the first resource, according to the first priority based on the first sidelink control information, according to a measurement result of received power of the received third sidelink control information, and according to a third priority based on the received third sidelink control information.

2. The terminal according to claim 1, wherein when it is determined not to perform the first transmission using the first resource, the processor determines a third resource for the first transmission, from one or more resources which are not indicated by received sidelink control information.

3. A radio communication method for a terminal, comprising:
determining a first resource for a first transmission, according to a first priority based on first sidelink control information, according to a measurement result of received power of received second sidelink control information, and according to a second priority based on the received second sidelink control information; and
transmitting the first sidelink control information indicating the first resource for the first transmission; and
determining, when received third sidelink control information indicates a second resource for a second transmission and the second resource is at least a part of the first resource, whether or not to perform the first transmission using the first resource, according to the first priority based on the first sidelink control information, according to a measurement result of received power of the received third sidelink control information, and according to a third priority based on the received third sidelink control information.

4. A system comprising a first terminal, a second terminal, and a third terminal, wherein
the first terminal comprises:
a transmitter that transmits first sidelink control information indicating a first resource for a first transmission; and
a processor that determines the first resource, according to a first priority based on the first sidelink control information, according to a measurement result of received power of received second sidelink control information, and according to a second priority based on the second sidelink control information,
wherein the processor, when received third sidelink control information indicates a second resource for a second transmission and the second resource is at least a part of the first resource, determines whether or not to perform the first transmission using the first resource, according to the first priority based on the first sidelink control information, according to a measurement result of received power of the received third sidelink control information, and according to a third priority based on the received third sidelink control information;
the second terminal transmits the received second sidelink control information, and
the third terminal transmits the received third sidelink control information.

* * * * *